US012233830B2

(12) United States Patent
Kim et al.

(10) Patent No.: US 12,233,830 B2
(45) Date of Patent: Feb. 25, 2025

(54) BRAKE CALIPER DIAGNOSTIC DEVICE FOR RAILWAY VEHICLES

(71) Applicant: KOREA RAILROAD RESEARCH INSTITUTE, Uiwang-si (KR)

(72) Inventors: Yeon Su Kim, Anyang-si (KR); Sung Hyuk Park, Anyang-si (KR)

(73) Assignee: KOREA RAILROAD RESEARCH INSTITUTE, Uiwang-si (KR)

( * ) Notice: Subject to any disclaimer, the term of this patent is extended or adjusted under 35 U.S.C. 154(b) by 283 days.

(21) Appl. No.: 17/935,748

(22) Filed: Sep. 27, 2022

(65) Prior Publication Data

US 2023/0166709 A1    Jun. 1, 2023

(30) Foreign Application Priority Data

Nov. 30, 2021 (KR) .................. 10-2021-0168795

(51) Int. Cl.
*B60T 17/22* (2006.01)
*B60T 8/88* (2006.01)
(Continued)

(52) U.S. Cl.
CPC ............ *B60T 17/228* (2013.01); *B60T 8/885* (2013.01); *B60T 17/22* (2013.01); *B60T 17/221* (2013.01);
(Continued)

(58) Field of Classification Search
CPC ........ B60T 17/228; B60T 8/885; B60T 17/22; B60T 17/221; B60T 2250/04;
(Continued)

(56) References Cited

U.S. PATENT DOCUMENTS 10,295,006 B2 * 5/2019 Serra .................... F16D 65/0006
11,828,333 B2 * 11/2023 Serra .................... F16D 65/0006
(Continued)

FOREIGN PATENT DOCUMENTS

EP        0391047 A1    10/1990
WO    2006092263 A1     9/2006
(Continued)

OTHER PUBLICATIONS

Extended European Search Report of EP Application No. 22198019.6 dated Apr. 18, 2023.

*Primary Examiner* — Dale W Hilgendorf
(74) *Attorney, Agent, or Firm* — Dinsmore & Shohl LLP; Yongsok Choi, Esq.

(57) ABSTRACT

A brake caliper diagnostic device for railway vehicles according to an embodiment of the present disclosure includes an internal pressure sensor located between a brake hose for delivering brake oil or compressed air to the brake caliper and an inlet of the brake caliper, internal temperature sensors respectively installed in the air breathers respectively located above and below the brake caliper, an assembly plate temperature sensor located adjacent to a brake pad assembly, a piston temperature sensor located on a surface of a brake caliper body adjacent to a piston, and a brake caliper monitoring device configured to determine whether or not the brake caliper is abnormal, based on data received from the internal pressure sensor, the internal temperature sensors, the assembly plate temperature sensor, and the piston temperature sensor.

7 Claims, 6 Drawing Sheets

(51) Int. Cl.
*B61L 15/00* (2006.01)
*F16D 66/00* (2006.01)

(52) U.S. Cl.
CPC .......... *B61L 15/0081* (2013.01); *F16D 66/00* (2013.01); *B60T 2250/04* (2013.01); *B60T 2270/406* (2013.01); *F16D 2066/001* (2013.01); *F16D 2066/005* (2013.01)

(58) Field of Classification Search
CPC ........... B60T 2270/406; B61L 15/0081; F16D 66/00; F16D 2066/001; F16D 2066/005
See application file for complete search history.

(56) References Cited

U.S. PATENT DOCUMENTS

| | | | | |
|---|---|---|---|---|
| 2013/0278771 | A1* | 10/2013 | Magoun | H04N 5/33 348/148 |
| 2017/0082164 | A1* | 3/2017 | Serra | F16D 65/092 |
| 2019/0178322 | A1* | 6/2019 | Merlo | G01L 5/28 |
| 2020/0384974 | A1* | 12/2020 | Call | B60T 17/228 |
| 2021/0276525 | A1* | 9/2021 | Mazzoleni | B60T 7/045 |
| 2022/0260126 | A1* | 8/2022 | Camozzi | G01L 5/162 |
| 2022/0381631 | A1* | 12/2022 | Macchi | B60T 17/221 |
| 2024/0132042 | A1* | 4/2024 | Ritter | B60T 13/741 |

FOREIGN PATENT DOCUMENTS

| | | | | |
|---|---|---|---|---|
| WO | WO-2020236392 | A1 * | 11/2020 | ............... B60Q 9/00 |
| WO | 2021199232 | A1 | 10/2021 | |

\* cited by examiner

BRAKE CALIPER DIAGNOSTIC DEVICE FOR RAILWAY VEHICLES

CROSS-REFERENCE TO RELATED APPLICATIONS

The present application claims priority under 35 U.S.C 119 (a) to Korean Patent Application No. 10-2021-0168795, filed on Nov. 30, 2021, which is incorporated herein by reference in its entirety.

BACKGROUND

1. Technical Field

The present disclosure relates to a brake caliper diagnostic device for railway vehicles.

2. Related Art

In the course of human life, various types of vehicles are used that may perform various tasks such as transporting freight or passengers, lifting and lowering objects, digging and burying the ground.

Among these vehicles, a tracked vehicle may particularly have a track like a caterpillar or use a track like a rail. A tracked vehicle using a caterpillar includes, for example, a crane, an excavator, a tank, and the like, and a tracked vehicle using a rail includes, for example, a railway vehicle.

The tracked vehicle also moves according to a preset speed and has to stop immediately or stop at a predetermined place or position when there is an urgent matter during operation, and such stopping is performed by a brake device of each tracked vehicle.

A brake system refers to a device that reduces the speed of a moving machine or stops the moving machine, such as a vehicle including an automobile.

The brake device includes a brake pad, a brake disc, and a brake caliper. The brake cylinders in the brake caliper use hydraulic or pneumatic pressure to force the brake pads to press the brake discs.

A brake device generates mechanical friction force to decelerate a railway vehicle or stay stationary, and thus, it is an essential core device for securing safety of passengers and vehicle systems. Accordingly, the brake device is required to have high stability, reliability, and durability.

In addition, when failure of a brake caliper, leakage of hydraulic oil (brake oil) or compressed air, or a fire in a brake system occur in a driverless railway vehicle, it is difficult to quickly recognize abnormality and to respond immediately, and thus, passengers and a railway vehicle may be put in fatal danger.

An example of the related art includes Korean Patent Registration No. 10-1248715 (Title: CONTROL UNIT FOR A RAIL VEHICLE).

SUMMARY

According to some embodiments of the present disclosure, an object is to provide a brake caliper diagnostic device that may measure a pressure and a temperature inside a brake caliper and a temperature on its surface thereof by using sensors and compare the measured pressure and temperature respectively with calculated reference values by using a brake control unit (BCU) or a brake operation unit (BOU) in consideration of a vehicle speed and a brake mode to diagnose failure or abnormality of the brake caliper.

However, technical objects to be achieved by the present embodiment are not limited to the technical object described above, and there may be other technical objects.

In order to achieve the object described above, a brake caliper diagnostic device for railway vehicles, according to an embodiment of the present disclosure, includes an internal pressure sensor located between a brake hose to provide brake oil or compressed air into the brake caliper and an inlet of the brake caliper, internal temperature sensors respectively installed in the air breathers respectively located above and below the brake caliper, an assembly plate temperature sensor located adjacent to a brake pad assembly, a piston temperature sensor located on a surface of a brake caliper body adjacent to a piston, and a brake caliper monitoring device configured to determine whether or not the brake caliper is abnormal, based on data received from the internal pressure sensor, the internal temperature sensors, the assembly plate temperature sensor, and the piston temperature sensor.

BRIEF DESCRIPTION OF THE DRAWINGS

Various embodiments of the present disclosure will become more apparent in view of the attached drawings and accompanying detailed description, in which.

DETAILED DESCRIPTION OF THE EMBODIMENTS

Figure 1:
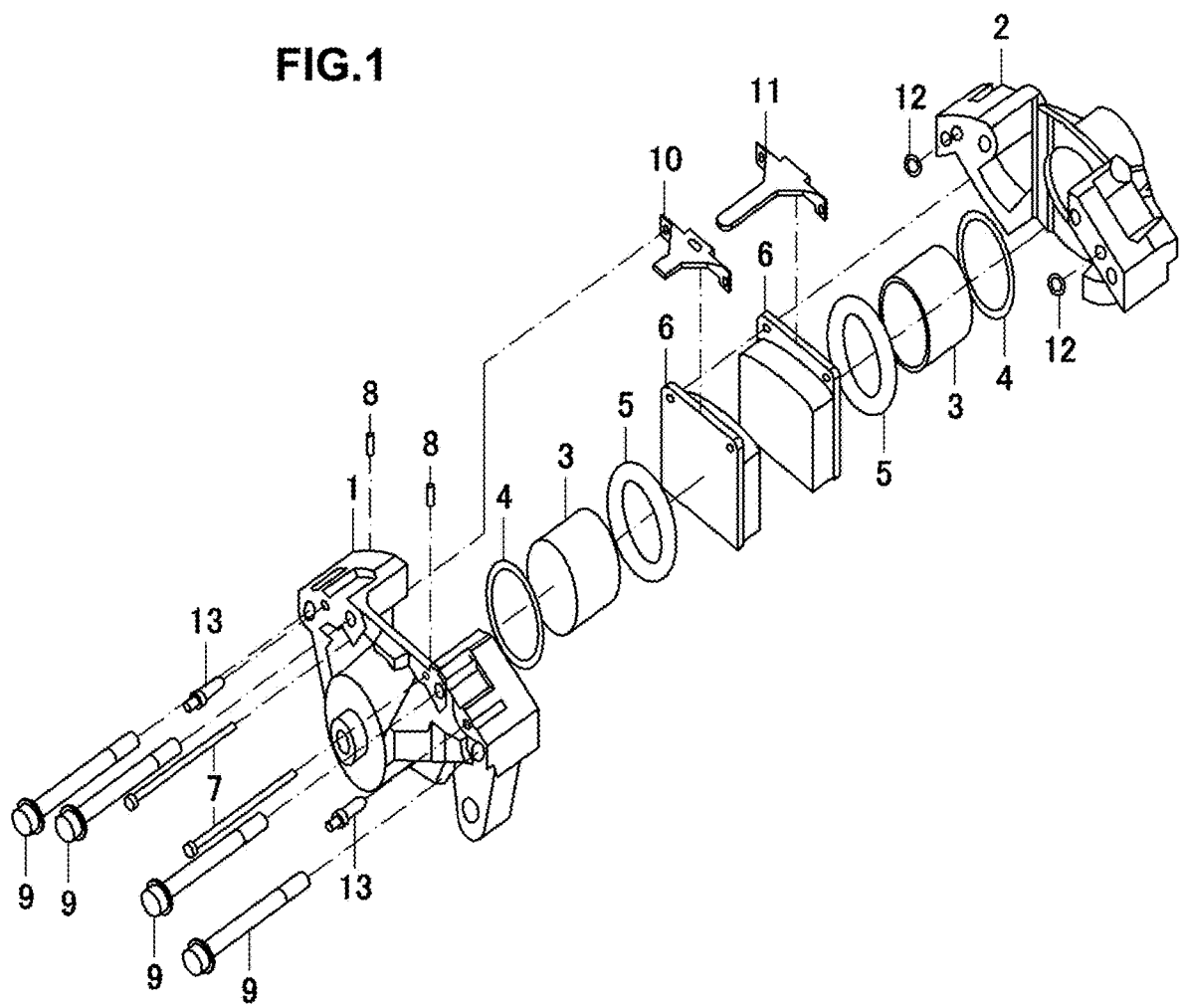
FIG. 1 is an exploded perspective view of a brake caliper for railway vehicles according to an embodiment of the present disclosure.

Hereinafter, embodiments of the present disclosure will be described in detail with reference to the accompanying drawings such that those skilled in the art may easily implement the embodiments. However, the present disclosure may be embodied in several different forms and is not limited to the embodiments described herein. In order to clearly describe the present disclosure in the drawings, parts irrelevant to the description are omitted, and similar reference numerals are attached to similar components throughout the specification.

Throughout the specification, when a portion is "connected" or "coupled" to another portion, this includes not only a case of being "directly connected or coupled" but also a case of being "electrically connected" with another element interposed therebetween. In addition, when a portion "includes" a certain component, this means that other components may be further included therein rather than excluding other components, unless otherwise stated.

The present disclosure relates to a brake caliper diagnostic device for railway vehicles.

FIG. 1 is an exploded perspective view of a brake caliper for railway vehicles according to an embodiment of the present disclosure.

Referring to FIG. 1, a brake caliper for railway vehicles includes a caliper body 1 and 2 assembled with four bridge bolts 9, and a brake pad assembly 6 is assembled in an axial direction with two pad pins 7 in the center the body.

Piston seals 4 are inserted into grooves formed on inner walls of central cylinders of the caliper bodies 1 and 2 to maintain airtightness with two pistons 3, and dust boots 5 are installed at inlets of the pistons 3 to cover inlet sides of the cylinder, thereby preventing intrusion of foreign substances from the outside.

The caliper bodies 1 and 2 have connection passages which are formed symmetrically and through which brake oil or compressed air supplied through inlets formed in one direction is delivered to the other caliper body 2, and caliper seals 12 are in close contact with the caliper bodies 1 and 2 to couple the caliper bodies 1 and 2 to each other with four bridge bolts 9.

Two brake pad assemblies 6 are suspended in the center of the caliper bodies 1 and 2 to receive a pressure pushed by the pistons 3 by the brake oil or compressed air.

Tangential forces due to brake torques generated when the brake pad assemblies 6 are in contact with a brake disk acts on torque reception portions of the caliper bodies 1 and 2 which face in parallel, and thus, unnecessary forces are not applied to the pistons 3 themselves. In addition, the brake pad assemblies 6 may be provided with restoring forces by pad springs 10 and 11 to move to original positions when not pressed by the pistons 3.

Two breather screws 13 are coupled to one side of the caliper body 1, and the breather screws 13 are fastened after air in a brake caliper for a railway vehicle is exhausted through air breathers, thereby preventing brake oil or compressed air from leaking.

The brake pad assemblies 6 include two brake pads 6a in contact with the brake disk and two brake pad assembly plates 6b located at one side of the brake pads 6a. Brake pads 6a and brake pad assembly plates 6b are shown in FIG. 2.

Figure 2:
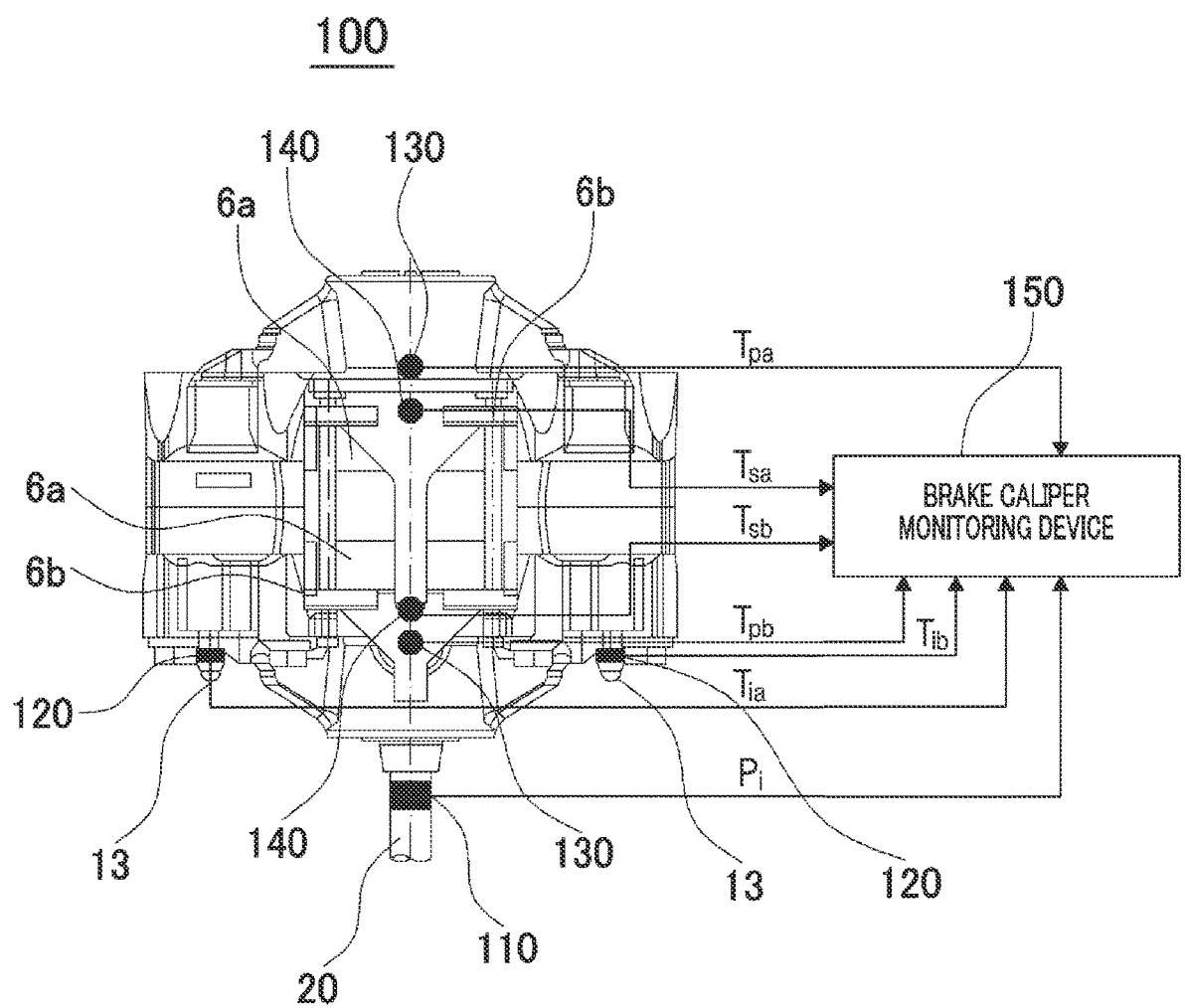
FIG. 2 is a schematic view of a brake caliper diagnostic device for railway vehicles according to an embodiment of the present disclosure.

FIG. 2 is a schematic diagram of a brake caliper diagnostic device 100 for railway vehicles according to an embodiment of the present disclosure.

The brake caliper diagnostic device 100 for railway vehicles includes an internal pressure sensor 110, internal temperature sensors 120, assembly plate temperature sensors 130, piston temperature sensors 140, and a brake caliper monitoring device 150.

The internal pressure sensor 110 may be located between a brake hose 20 that delivers brake oil or compressed air to a brake caliper for railway vehicles and an inlet of the brake caliper for railway vehicles and may measure an internal pressure of the brake caliper for railway vehicles. When a pressure of brake oil or compressed air is high, a pressure applied to a brake disk by the brake pad 6a increases to greatly increase a temperature due to frictional heat between the brake disk and the brake pads 6a, and when the pressure of the brake oil or the compressed air is low, the pressure applied to the brake disk by the brake pads 6a is reduced to reduce brake effort.

The internal temperature sensors 120 may be respectively installed in air breathers respectively located above and below the brake caliper for a railway vehicle. For example, the internal temperature sensors 120 may be located at end portions of the breather screws 13 inserted in the air breathers to be fixed thereto but are not limited thereto. In this case, the internal temperature sensors 120 may measure a temperature of brake oil or compressed air flowing into the brake caliper for a railway vehicle. When the brake oil or the compressed air is out of an operating temperature range through the internal temperature sensors 120, various rubber packings or seals installed in the brake caliper for railway vehicles may be hardened or deteriorated to cause leakage of oil or air. In particular, brake oil has a significant change in viscosity at a temperature below a pour point, which may affect brake performance, and the brake caliper diagnostic device 100 may measure an internal temperature of the brake caliper for railway vehicles through the internal temperature sensors 120 to determine whether the internal temperature is within an operating temperature range.

The assembly plate temperature sensors 130 are respectively located adjacent to the brake pad assemblies 6. For example, the assembly plate temperature sensors 130 may be located over the brake pad assembly plate 6 but is not limited thereto. The assembly plate temperature sensors 130 generate a high temperature when friction brake occurs because the brake disk is in close contact with the brake pad 6a, and the high temperature is transferred to the brake caliper for a railway vehicle through the brake pad assembly 6, and since a temperature measured in the brake pad assembly 6 is the highest temperature, the brake pad assembly 6 is a temperature measurement position required for diagnosis of the brake caliper device.

The piston temperature sensors 140 are respectively located on surfaces of the brake caliper bodies 1 and 2 adjacent to the pistons 3. The piston temperature sensors 140 are located on the surfaces of the caliper bodies 1 and 2 to measure temperatures in preparation for a case where fire or excessively high heat occurs on a surface of the brake caliper for railway vehicles, and a surface on which the piston 3 is located has the highest temperature due to heat transferred from the brake pad assembly 6. Therefore, it is preferable to measure a surface temperature of the brake caliper device at the surface on which the pistons 3 are located.

The brake caliper monitoring device 150 determines whether the brake caliper for a railway vehicle is abnormal, based on data received from the sensors 110, 120, 130, and 140. The brake caliper monitoring device 150 includes a processor for processing signals input to the brake caliper monitoring device 150. The brake caliper monitoring device 150 is similar to, but not limited to, an electronic control unit (ECU) typically used in the art. In detail, the brake caliper monitoring device 150 may compare the measured values received from the sensors 110, 120, 130, and 140 with the calculated reference values by considering a vehicle speed and a brake mode received from a brake control unit (BCU) or a brake operation unit (BOU) to diagnose whether the brake caliper for railway vehicles fails or is abnormal.

Figure 3:
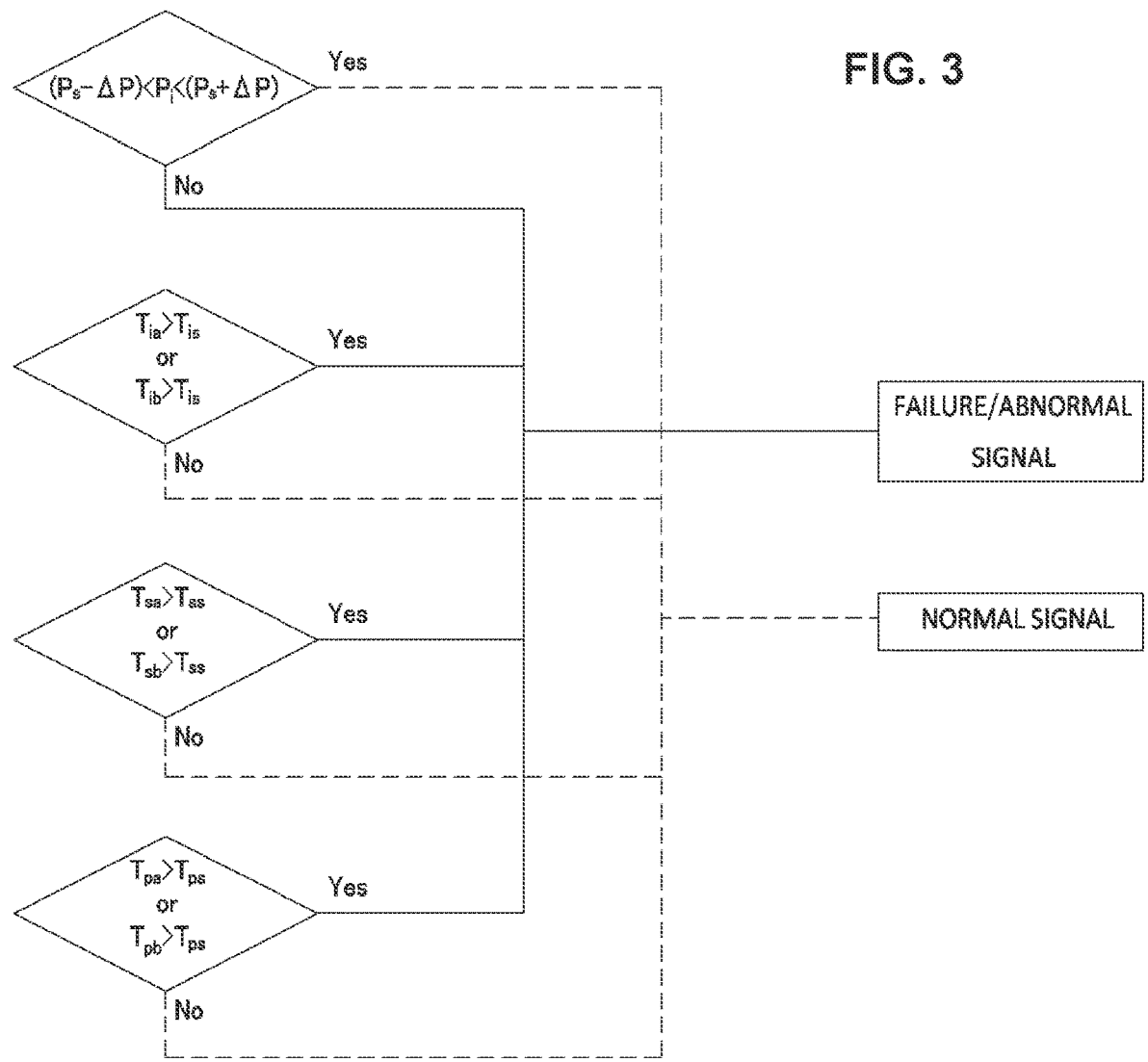
FIG. 3 is a flowchart of a brake caliper diagnostic device for railway vehicles according to an embodiment of the present disclosure.

FIG. 3 is a flowchart for diagnosing whether a brake caliper for railway vehicles in the brake caliper monitoring device 150 according to the present disclosure fails or is abnormal.

Referring to FIG. 3, the brake caliper monitoring device 150 compares a pressure reference value of the brake caliper for railway vehicles which is calculated by the brake operation unit (BOU) with the pressure actually measured from the brake caliper for railway vehicles to diagnose whether the brake caliper for railway vehicles operates normally or fails or is abnormal. In addition, the brake caliper monitoring device 150 compares the temperature values received from the internal temperature sensors 120, the assembly plate temperature sensors 130, and the piston temperature sensors 140 with a preset reference temperature to diagnose whether the brake caliper for railway vehicles operates normally or fails or is abnormal. In this case, the brake caliper monitoring device 150 may transmit the diagnosed information to the train control and monitoring system (TCMS).

In detail, the brake caliper monitoring device 150 may determine that it is normal when a pressure value Pi received from the internal pressure sensor 110 is between (Ps−ΔP) and (Ps+ΔP) which are allowable values ΔP of a reference pressure and determine that the brake caliper for railway vehicles is abnormal or fails when the pressure value Pi is out of the allowable range between (Ps−ΔP) and (Ps+ΔP). In this case, the reference pressure Ps may be a value calculated by the brake control unit (BCU) or the brake operation unit (BOU) in consideration of a vehicle speed, a vehicle weight including a passenger weight, and a generative brake force (electric brake force). In addition, the allowable value ΔP is a fixed ratio of the reference pressure Ps as a pressure fluctuation allowable value in consideration of a brake distance tolerance of a railway vehicle and may be determined when designing a brake caliper for a railway vehicle.

When temperature values $T_{ia}$ and $T_{ib}$ received from the internal temperature sensors 120 exceed a reference temperature value $T_{is}$, the brake caliper monitoring device 150 may determine that the brake caliper for railway vehicles is abnormal or fails, and when temperature values $T_{ia}$ and $T_{ib}$ are less than or equal to the reference temperature value $T_{is}$, the brake caliper monitoring device 150 may determine that the brake caliper for railway vehicles is normal. In addition, the brake caliper monitoring device 150 may additionally set a lower limit reference temperature value, and when the temperature values received from the internal temperature sensors 120 are less than or equal to the lower limit reference temperature value, the brake caliper monitoring device 150 may determine that the brake caliper for railway vehicles is abnormal or fails.

When temperature values $T_{pa}$ and $T_{pb}$ received from the assembly plate temperature sensors 130 exceed a reference temperature value $T_{ps}$, the brake caliper monitoring device 150 may determine that the brake caliper for railway vehicles is abnormal or fails, and when the temperature values $T_{pa}$ and $T_{pb}$ are less than or equal to the reference temperature value $T_{ps}$, the brake caliper monitoring device 150 may determine that the brake caliper for railway vehicles is normal.

When temperature values $T_{sa}$ and $T_{sb}$ received from the piston temperature sensors 140 exceed a reference temperature value $T_{ss}$, the brake caliper monitoring device 150 may determine that the brake caliper for railway vehicles is abnormal or fails, and when the temperature values $T_{sa}$ and $T_{sb}$ are less than or equal to the reference temperature value $T_{ss}$, the brake caliper monitoring device 150 may determine that the brake caliper for railway vehicles is normal.

As described above, the brake caliper monitoring device 150 may compare the temperature values received from sensors with a calculated reference value in consideration of a brake mode to diagnose whether that the brake caliper for railway vehicles fails or is abnormal.

The brake mode may include a service brake command mode, an emergency brake command mode, and a stop brake command mode.

Figure 4:
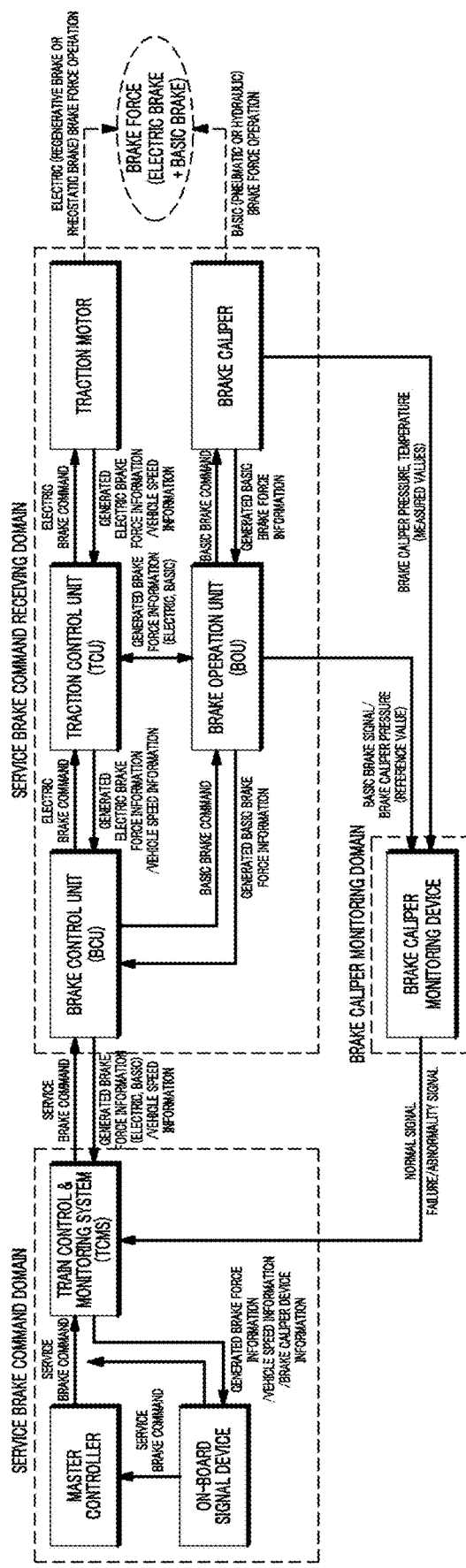
FIG. 4 is a configuration diagram during service brake of a railway vehicle according to an embodiment of the present disclosure.

FIG. 4 is a configuration diagram during service brake of a railway vehicle according to an embodiment of the present disclosure;

By Referring to FIG. 4, the service brake command mode is generated by an on-board signal device in a driverless operation mode and is generated by a driver's master controller operation in a manual operation mode. In addition, the service brake command is transmitted to a brake control unit (BCU) via a train control & monitoring system (TCMS), where an electric brake (regenerative brake or rheostatic brake) command is transmitted to a traction control unit (TCU), and a basic brake (pneumatic or hydraulic) command is transmitted to a brake operation unit (BOU). In this case, the traction control unit (TCU) causes a traction motor to generate electric brake first, and exchanges information related to a brake force with a brake operation unit (BOU) such that basic brake compensates for a lack in a total brake force required for a railway vehicle. The brake operation unit (BOU) generates an insufficient brake force excluding the maximum electric brake force from the total brake force required for a railway vehicle through the brake caliper for railway vehicles. Here, the electric brake is divided into regenerative brake which returns electricity generated by electric brake to a catenary (a power line) and rheostatic brake which consumes brake force through a resistor, depending on railway vehicles, and the basic brake is divided into pneumatic brake caused by pneumatic brake caliper and hydraulic brake caused by hydraulic brake caliper. During the service brake, the brake caliper monitoring device compares a required basic brake force (a pressure reference value of a brake caliper device) calculated by the brake operation unit (BOU) with a pressure actually measured in the brake caliper for railway vehicles to diagnose a normal operation or failure/abnormality and transmits the relevant information to a train control & monitoring system (TCMS). In addition, the brake caliper monitoring device 150 compares preset temperature reference values of the inside and surface of the brake caliper for railway vehicles with an actual temperature measured in the brake caliper for railway vehicles to diagnose a normal operation or failure/abnormality and transmits the relevant information to a train control & monitoring system (TCMS). The train control & monitoring system (TCMS) finally transmits the information on the brake caliper for railway vehicles to an operation & control center (OCC) of a railway vehicle via an on-board signal device and a track-side signal device.

Figure 5:
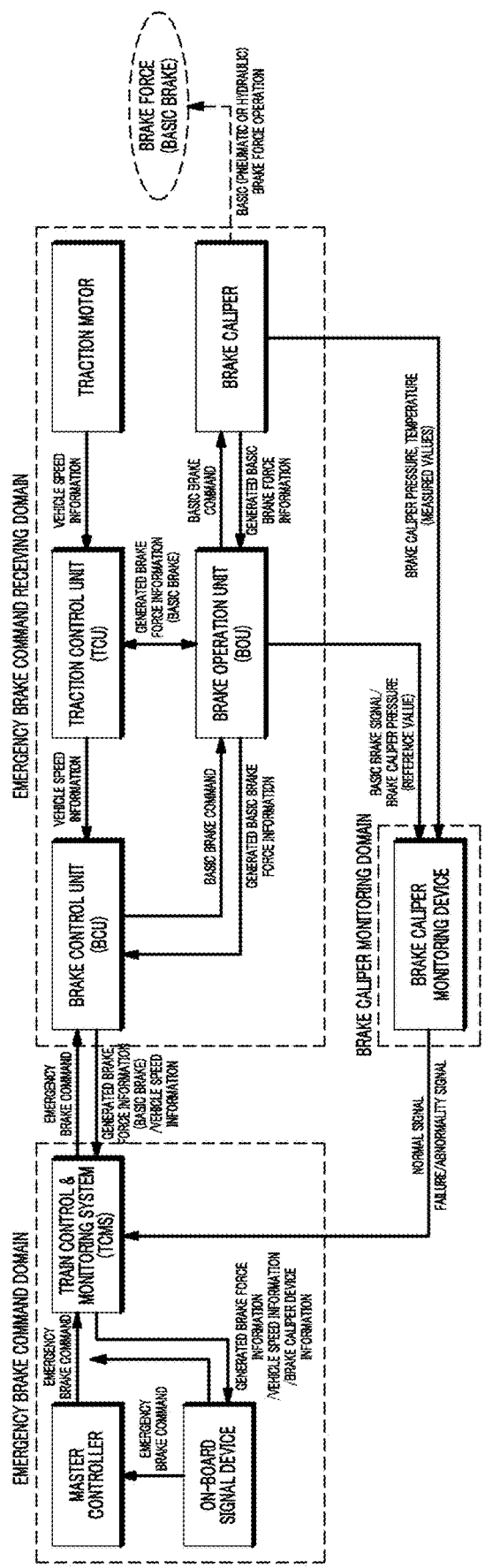
FIG. 5 is a configuration diagram during emergency brake of a railway vehicle according to an embodiment of the present disclosure.

FIG. 5 is a configuration diagram during emergency brake of a railway vehicle according to an embodiment of the present disclosure.

By referring to FIG. 5, the emergency brake command mode is generated by an on-board signal device in a driverless operation mode and is generated by a driver's emergency brake button operation in a manual operation mode. An emergency brake command is transmitted to a brake control unit (BCU) via a train control & monitoring system (TCMS), and basic brake is commanded to a BOU to generate a maximum deceleration of a railway vehicle set during emergency brake. In this case, the traction control unit (TCU) transmits vehicle speed information measured by a traction motor to train control & monitoring system (TCMS) via the brake control unit (BCU). The basic brake is divided into pneumatic brake caused by a pneumatic brake caliper and hydraulic brake caused by a hydraulic brake caliper as in the service brake mode. In the emergency brake mode, the brake caliper monitoring device 150 compares the basic brake command (a pressure reference value of the brake caliper for a railway vehicle) that generates maximum deceleration of a railway vehicle which is set during emergency brake with an actual pressure measured in the brake caliper for a railway vehicle to diagnose a normal operation or failure/abnormality and transmits the relevant information to the train control & monitoring system (TCMS). In addition, the brake caliper monitoring device compares a preset temperature reference values of the inside and surface of the brake caliper for railway vehicles with an actual temperature measured in the brake caliper for railway vehicles to diagnose a normal operation or failure/abnormality and transmits the relevant information to the train control & monitoring system (TCMS). The train control & monitoring system (TCMS) finally transmits the information on the brake caliper for railway vehicles to an operation & control center (OCC) of a railway vehicle via an on-board signal device and a track-side signal device.

Figure 6:
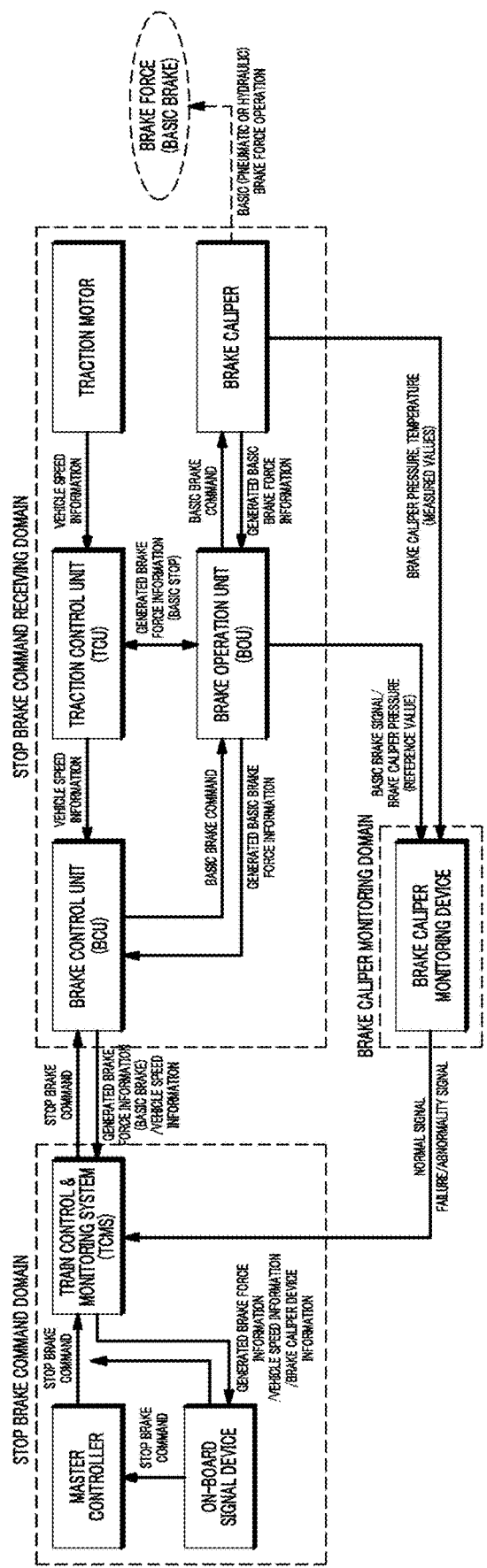
FIG. 6 is a configuration diagram during stop brake of a railway vehicle according to an embodiment of the present disclosure.

FIG. 6 is a configuration diagram during stop brake of a railway vehicle according to an embodiment of the present disclosure.

By referring to FIG. 6, the stop brake command mode is generated by the on-board signal device in a driverless operation mode and is generated by a driver's master controller operation in a manual operation mode. Because stop brake is performed only with basic brake as in the emergency brake, the brake command and diagnostic functions of the brake caliper for a railway vehicle operate similarly to the emergency brake. In the stop brake mode, the brake caliper monitoring device compares the basic brake command (a pressure reference value of the brake caliper for a railway vehicle) required by a stopping railway vehicle with an actual pressure measured in the brake caliper for a railway vehicle to diagnose a normal operation or failure/abnormality and transmits the relevant information to the train control & monitoring system (TCMS). In addition, the brake caliper monitoring device compares set temperature reference values of the inside and surface of the brake caliper for railway vehicles with an actual temperature measured in the brake caliper for railway vehicles to diagnose a normal operation or failure/abnormality and transmits the relevant information to the train control & monitoring system (TCMS). The train control & monitoring system (TCMS) finally transmits the information on the brake caliper for railway vehicles to an operation & control center (OCC) of a railway vehicle via an on-board signal device and a track-side signal device.

The present disclosure has an effect that sensors measure a pressure and a temperature inside a brake caliper device and a temperature of a surface thereof, and the measured pressure and temperature are respectively compared with calculated reference values by a brake control unit (BCU) or a brake operation unit (BOU) in consideration of a vehicle speed and a brake mode, and thereby, failure or abnormality of the brake caliper device may be diagnosed.

The above description of the present disclosure is an example, and those skilled in the art to which the present disclosure pertains may understand that the present disclosure may be easily modified into other specific forms without changing the technical idea or essential features thereof. Therefore, it should be understood that the embodiments described above are illustrative in all respects and not restrictive. For example, each component described as a single type may be implemented in a dispersed form, and likewise components described as distributed may be implemented in a combined form.

The scope of the present disclosure is indicated by the following claims rather than the above detailed description, and all changes or modifications derived from the meaning and scope of the claims and their equivalent concepts should be interpreted as being included in the scope of the present disclosure.

What is claimed is:

1. A brake caliper diagnostic device for railway vehicles comprising:

an internal pressure sensor located between a brake hose for delivering brake oil or compressed air to a brake caliper and an inlet of the brake caliper;

internal temperature sensors respectively installed in air breathers respectively located above and below the brake caliper;

an assembly plate temperature sensor located adjacent to a brake pad assembly;

a piston temperature sensor located on a surface of a brake caliper body adjacent to a piston; and a brake caliper monitoring device configured to determine whether the brake caliper is abnormal, based on data received from the internal pressure sensor, the internal temperature sensors, the assembly plate temperature sensor, and the piston temperature sensor.

2. The brake caliper diagnostic device according to claim 1, wherein the brake caliper monitoring device compares the sensed values received from the internal pressure sensor, the internal temperature sensors, the assembly plate temperature sensor, and the piston temperature sensor with a calculated reference value by considering a vehicle speed and a brake mode received from a brake control unit (BCU) or a brake operation unit (BOU) to diagnose whether the brake caliper of the railway vehicle fails or is abnormal.

3. The brake caliper diagnostic device according to claim 2, wherein the brake mode includes a service brake command mode, an emergency brake command mode, and a stop brake command mode, and a pressure reference value and a temperature reference value preset according to the modes are compared with measured values received from the internal pressure sensor, the internal temperature sensors, the assembly plate temperature sensor, and the piston temperature sensor to diagnose whether the brake caliper fails or is abnormal.

4. The brake caliper diagnostic device according to claim 2, wherein the brake caliper monitoring device determines that the brake caliper is normal when a pressure value received from the internal pressure sensor is in an allowable value range of a reference pressure and determines that the brake caliper is abnormal or fails when the pressure value is out of the allowable value range.

5. The brake caliper diagnostic device according to claim 2, wherein the brake caliper monitoring device determines that the brake caliper is abnormal or fails when temperature values received from the internal temperature sensors exceed a reference temperature value, and determines that the brake caliper is normal when the temperature values are less than or equal to the reference temperature value.

6. The brake caliper diagnostic device according to claim 2, wherein the brake caliper monitoring device determines that the brake caliper is abnormal or fails when temperature values received from the assembly plate temperature sensor exceed a reference temperature value, and determines that the brake caliper is normal when the temperature values are less than or equal to the reference temperature value.

7. The brake caliper diagnostic device according to claim 2, wherein the brake caliper monitoring device determines that the brake caliper is abnormal or fails when temperature values received from the piston temperature sensor exceed a reference temperature value, and determines that the brake caliper is normal when the temperature values are less than or equal to the reference temperature value.

* * * * *